United States Patent
Tejón et al.

(10) Patent No.: US 12,449,143 B2
(45) Date of Patent: Oct. 21, 2025

(54) MODULAR BUILDING STRUCTURE ADAPTED FOR THERMAL REGULATION THEREIN

(71) Applicant: Freshape SA, Villaz-St-Pierre (CH)

(72) Inventors: Ana Tejón, Ecublens (CH); Sebastián Alagón, Romainmôtier (CH); Mathieu Rubi, Denges (CH); Chin Lee Ong, Lausanne (CH)

(73) Assignee: Freshape SA, Renens (CH)

( * ) Notice: Subject to any disclaimer, the term of this patent is extended or adjusted under 35 U.S.C. 154(b) by 292 days.

(21) Appl. No.: 18/024,330

(22) PCT Filed: Aug. 30, 2021

(86) PCT No.: PCT/IB2021/057906
§ 371 (c)(1),
(2) Date: Mar. 2, 2023

(87) PCT Pub. No.: WO2022/049473
PCT Pub. Date: Mar. 10, 2022

(65) Prior Publication Data
US 2023/0314016 A1     Oct. 5, 2023

(30) Foreign Application Priority Data

Sep. 2, 2020   (EP) .................................. 20194023

(51) Int. Cl.
*E04B 1/32*     (2006.01)
*E06B 9/24*     (2006.01)
(Continued)

(52) U.S. Cl.
CPC .......... *F24F 5/0075* (2013.01); *E04B 1/3211* (2013.01); *E06B 9/24* (2013.01);
(Continued)

(58) Field of Classification Search
CPC ...... E04B 1/3205; E04B 1/3211; E04B 1/342; E04B 2001/3223; E04B 2001/3235;
(Continued)

(56) References Cited

U.S. PATENT DOCUMENTS 2,852,109 A * 9/1958 Pine ..................... E04B 1/7069
                                                  52/302.3
3,257,930 A    6/1966 Averna
(Continued)

FOREIGN PATENT DOCUMENTS

CN     105202669 A    12/2015
ES       1198233 U    11/2017
(Continued)

OTHER PUBLICATIONS

International Search Report and Written Opinion for PCT/IB2021/057906, dated Nov. 19, 2021, 14 pgs.

*Primary Examiner* — Kyle J. Walraed-Sullivan
(74) *Attorney, Agent, or Firm* — Blank Rome LLP

(57) ABSTRACT

A modular building structure has a framework including a plurality of rods and connectors to interconnect the plurality of rods together, and empty spaces bordered by corresponding rods. A plurality of panels, wherein one panel is mounted inside each empty space and connected to the framework to create an interior, an air chamber layer inside which air may circulate. The air chamber layer forms at least a portion of an outer surface of the interior. At least one upper valve system is mounted in the upper portion of the structure, and at least one lower valve system is mounted in the lower portion of the structure. The upper and lower valve systems are selectively operable to regulate the thermal conditions inside the interior as a function of the meteorological conditions outside and a desired temperature inside. A method operates the upper and lower valve systems.

18 Claims, 15 Drawing Sheets

(51) Int. Cl.
*F24F 5/00* (2006.01)
*F24F 11/76* (2018.01)
*F24F 13/02* (2006.01)

(52) U.S. Cl.
CPC .......... *F24F 11/76* (2018.01); *F24F 13/0272* (2013.01); *E04B 2001/3247* (2013.01); *E04B 2001/3252* (2013.01); *E04B 2001/3294* (2013.01); *E06B 2009/2464* (2013.01)

(58) Field of Classification Search
CPC ..... E04B 2001/3241; E04B 2001/3247; E04B 2001/3252; E04B 2001/327; E04B 2001/3276; E04B 2001/3282; E04B 2001/3288; E04B 2001/3294; E04B 7/105; E04B 7/102; E06B 2009/2464; F24F 7/04; F24F 7/06; F24F 7/065; F24F 7/08; F24F 5/0075; F24F 13/0227; F24F 5/0017; F24F 2005/0025
USPC .......................................... 52/81.1, 81.2, 81.3
See application file for complete search history.

(56) References Cited

U.S. PATENT DOCUMENTS

| | | | | |
|---|---|---|---|---|
| 3,537,378 A | * | 11/1970 | Daly | E04B 1/0023 52/168 |
| 4,197,993 A | * | 4/1980 | Trombe | E04B 1/62 126/630 |
| 4,295,415 A | * | 10/1981 | Schneider, Jr. | F24D 11/007 454/366 |
| 4,324,289 A | | 4/1982 | Lahti | |
| 4,370,073 A | * | 1/1983 | Ohme | E04B 1/19 403/255 |
| 4,491,437 A | * | 1/1985 | Schwartz | E04B 1/3211 52/81.3 |
| 4,698,941 A | * | 10/1987 | Rieder | E04B 1/3211 52/81.3 |
| 4,848,047 A | * | 7/1989 | Sneyd | E04B 1/3211 D25/19 |
| 5,918,438 A | * | 7/1999 | South | E04B 1/3211 52/80.1 |
| 5,996,288 A | * | 12/1999 | Aiken | E04B 1/3211 52/81.3 |
| 7,549,418 B1 | | 6/2009 | Moorman | |
| 2005/0022461 A1 | * | 2/2005 | Geiger | E04B 1/3211 52/81.3 |
| 2008/0307720 A1 | * | 12/2008 | Howe | E04B 1/3211 52/81.3 |
| 2009/0049763 A1 | * | 2/2009 | Blundell | F24S 20/66 52/80.1 |
| 2012/0247035 A1 | * | 10/2012 | Zook | E04B 1/3211 52/81.3 |
| 2015/0101645 A1 | * | 4/2015 | Neville | A01G 9/16 135/125 |
| 2015/0275515 A1 | * | 10/2015 | Garvey | E04B 1/3211 52/81.3 |
| 2016/0010326 A1 | * | 1/2016 | Fishburn | E04B 1/74 52/302.1 |
| 2016/0258152 A1 | * | 9/2016 | Bierschenk | C04B 28/34 |
| 2017/0010044 A1 | | 1/2017 | Zemmouri | |
| 2017/0130475 A1 | * | 5/2017 | Park | F24F 13/26 |
| 2017/0298613 A1 | * | 10/2017 | Lee | E04B 1/3211 |
| 2019/0055729 A1 | * | 2/2019 | Dietz | E04B 1/3211 |
| 2019/0382998 A1 | * | 12/2019 | Rim | E04B 1/3211 |

FOREIGN PATENT DOCUMENTS

| | | |
|---|---|---|
| GB | 2497917 A | 7/2013 |
| GB | 2561353 A | 10/2018 |
| JP | 2005-226978 A | 8/2005 |
| JP | 2014-051827 A | 3/2014 |
| KR | 10-2018-0001856 A | 1/2018 |

* cited by examiner

A-A

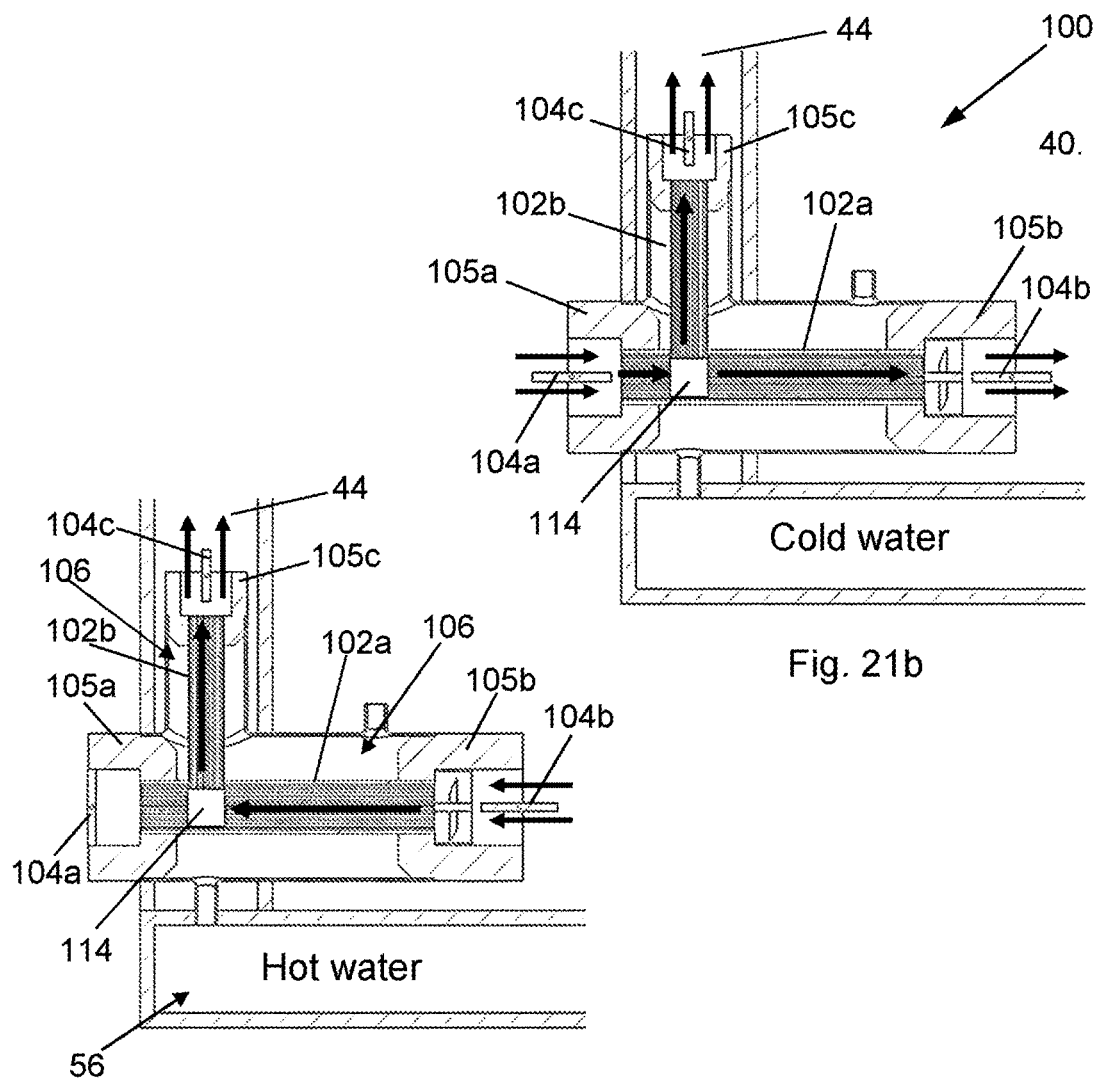
Fig. 21b
Fig. 21c
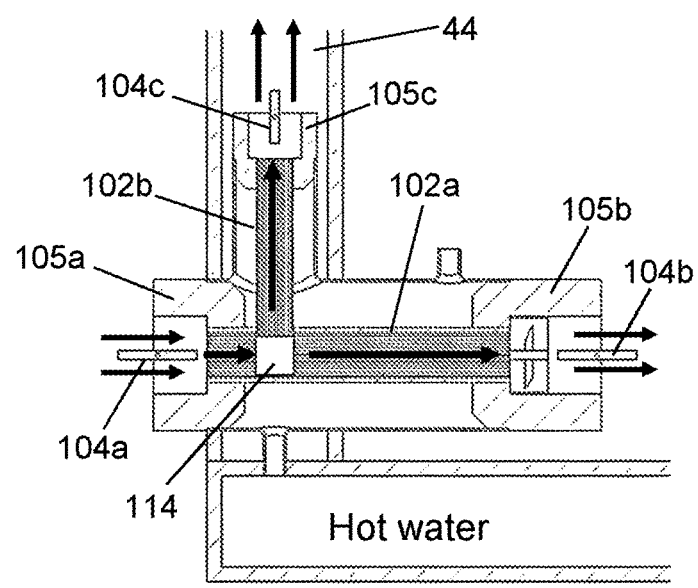
Fig. 21d

MODULAR BUILDING STRUCTURE ADAPTED FOR THERMAL REGULATION THEREIN

RELATED APPLICATIONS

The present application is a national phase of PCT/IB2021/057906, filed Aug. 30, 2021, which claims the benefit of European Patent Application No. EP20194023.6, filed Sep. 2, 2020. The entire disclosures of which are hereby incorporated by reference.

FIELD OF THE INVENTION

The present invention relates generally to a modular building structure and more particularly to a modular building structure comprising valve systems operatively adapted to control heating, ventilation and air conditioning (HVAC) demands to regulate thermal conditions inside the structure as a function of climate changes occurring all year round. The present invention further relates to a method for operating the valve systems of the modular building structure.

DESCRIPTION OF RELATED ART

Modular building structures with the regulation of thermal conditions inside the structures already exist.

ES1198233U, for example, discloses a modular building structure comprising a plurality of panels with several sides adapted to be connected to each other in order to form a geodesic dome. Each panel comprises a first and a second pane attached on both sides of a spacer. The spacer comprises a perimeter wall which forms an interior space between the first and second panes. Apertures are arranged through the perimeter wall such that, when the panels are connected to each other, their respective interior space are in fluid communication with each other in order to form a ventilation chamber. The lower panels at the base of the geodesic dome include air inlets arranged towards the outside of the dome and through which the air flow penetrates, which is made to circulate through the ventilation chamber to air outlets arranged in upper panels at the top of the dome.

One disadvantage of this modular building structure stems from the fact that the ventilation chamber is only in fluid communication with air outside the modular building structure which may influence the thermal conditions inside the dome only to some extent.

JP2014051827 discloses a dome-like structure which can suppress dew condensation water inside the dome structure. To this end, the dome structure comprises an intake port and an exhaust port arranged respectively on the lower and upper parts of the dome structure, and a ventilation layer extending from the intake port to the exhaust port to promote ventilation inside the dome wall and the erection wall. The dome structure further comprises a ventilation structure under a cupola to draw air from the indoor side to the outdoor side of the dome structure.

The dome structure is however adapted only for cooling and for air renewal of the interior of the structure. This structure is therefore not adapted for regulating temperature as a function of climate changes occurring all year round.

An aim of the present invention is therefore to provide a modular building structure comprising a HVAC system for optimal living environment inside its structure independently of the climate changes throughout the year.

Another aim of the present invention is to provide a modular building structure whose parts which make up its structure are easy to manufacture and to be assembled together.

BRIEF SUMMARY OF THE INVENTION

These aims are achieved by a modular building structure comprising a framework including a plurality of rods and hub connectors to interconnect the plurality of rods together. The framework comprises empty spaces bordered by corresponding rods of the plurality of rods. The modular building structure also comprises a plurality of panels, wherein one panel is mounted inside each empty space and is connected to the framework in order to create an interior. The modular building structure further comprises an air chamber layer inside which air may circulate. The air chamber layer forms at least a portion of a wall of the interior.

At least one upper valve system is mounted in an upper portion of the modular building structure while at least one lower valve system is mounted in a lower portion of the modular building structure. The at least one upper and lower valve systems are selectively actuable to perform any of the following functions:

a) draw the air outside the modular building structure through the at least one lower valve system into the air chamber layer and to expel the ascending air from the air chamber layer to outside the modular building structure through the at least one upper valve system, b) draw the air inside the interior into the air chamber layer through the at least one lower valve system and to expel the ascending air from the air chamber layer into the interior through the at least one upper valve system, c) seal the air chamber layer and the interior from the outside such that the air chamber layer acts as an insulator layer for the interior, d) draw the air inside the interior into the air chamber layer through the at least one lower valve system and expel the ascending air from the air chamber layer to outside the modular building structure through the at least one upper valve system while the interior is in fluid communication with the air outside the modular building structure through the at least one lower valve system, e) draw the air outside the modular building structure through the at least one lower valve system into the air chamber layer and to expel the ascending air from the air chamber layer into the interior through the at least one upper valve system while the interior is in fluid communication with the air outside the modular building structure through the at least one lower valve system, and f) create a first and a second air communication between the air outside the modular building structure and an upper and a lower part of the interior through respectively the at least one upper valve system and the at least one lower valve system.

In an embodiment, the at least one lower valve system is a valve system comprising a heat exchanger. The valve system comprises a housing arranged upstream the air chamber layer and extending from outside towards the interior of the building structure to cool down air entering the air chamber layer from the outside, or to heat up air entering the air chamber layer from outside or from the interior of the building structure.

In an embodiment, the housing comprises a water chamber and at least one core mounted inside the water chamber.

The water chamber comprises and inlet and an outlet in fluid communication with a water tank arranged on the base of the modular building structure via a closed loop water circuit comprising a pump system.

In an embodiment, the housing comprises first, second and third flap housing parts defining an opening in fluid communication with the at least one core. The valve system comprises an outside flap, an inside flap and an air chamber flap pivotably mounted inside respective first, second and third flap housing parts. Each flap is arranged to be actuated to be brought from an open configuration to a closed configuration and vice versa to activate the at least one lower valve system according to the selected function among said functions a) to f).

In an embodiment, the at least one lower valve system with heat exchanger comprises a first and a second longitudinal core mounted inside the water chamber. The first and second longitudinal cores extend perpendicularly from each other.

In an embodiment, the at least one lower valve system comprises a fan mounted near or at a distal end of the first and/or of the second longitudinal core.

In an embodiment, the at least one core or the first and second core is/are made of ceramic, or any other hydrophilic porous material, comprising a honeycomb structure.

In an embodiment, the air chamber layer forms substantially the entire outer surface of said interior.

In an embodiment, some or all of said panels comprise each an outer pane comprising outer pane connectors and an inner pane comprising inner pane connectors. The outer pane connectors are connected to corresponding outer pane connecting parts of different hub connectors while the inner pane connectors are connected to corresponding inner pane connecting parts of the same of said different hub connectors.

In an embodiment, the outer pane and the inner pane of the panel comprise each N rectilinear sides. The outer pane and the inner pane comprise respectively N outer pane connectors and N inner pane connectors mounted on converging portion of two rectilinear sides the outer pane and the inner pane respectively.

In an embodiment, N is a number selected between 3 and 8.

In an embodiment, some or all the panels comprise at least one intermediate pane mounted between the outer and inner panes.

In an embodiment, the at least one intermediate pane, and/or the outer pane and/or the inner pane is/are selected between a solar cell panel, a photovoltaic/thermal (PVT) panel, a thermal collector panel, a heated glass, a smart glass, an insulating panel and a transparent panel/pane.

In an embodiment, the smart glass is configured to change from transparent to translucent or opaque and vice versa. The smart glass is electrically connected to a power source and a control unit to control the appearance of the smart glass.

In an embodiment, the modular building structure further comprises a base including a plurality of bars and connectors to interconnect the plurality of bars together in a horizontal plane. The plurality of bars is connected to a lower part of the framework. One or more slabs or water tanks filled with liquid are mounted on the base to bring stability to the modular building structure.

In an embodiment, a first thermal conditions sensor is mounted inside the interior and a second thermal conditions sensor is located outside the modular building structure. The at least one upper and lower valve systems are configured to be electrically-actuated as a function of the thermal conditions sensed by the first and second thermal conditions sensors.

Another aspect of the invention relates to a method for operating the at least one upper and lower valves systems of the modular building structure so as to draw the air inside the interior through the at least lower valve system into the air chamber layer and to expel the ascending air from the air chamber layer through said upper valve system into the interior to increase the temperature inside the interior during a first period of time.

In an embodiment, the method further comprises the step of operating the at least one upper and lower valve systems, during a second period of time different from said first period of time, so as to draw the air outside the modular building structure through the at least one lower valve system into the air chamber layer and to expel the ascending air from the air chamber layer into the interior through the at least one upper valve system while the interior is in fluid communication with the air outside the modular building structure through at least one lower valve system.

In an embodiment, the method further comprises the step of operating the at least one upper and lower valve systems, during a second period of time different from said first period of time, so as to seal the air chamber layer and the interior from the outside such that the air chamber layer acts as an insulator layer.

In an embodiment, the method further comprises the step of operating the at least one upper and lower valve systems, during a second period of time different from said first period of time, so as create a first and a second air communication between the air outside the modular building structure and an upper and a lower part of the interior through respectively the at least one upper valve system and the at least one lower valve system.

In an embodiment, the method further comprises the step of operating the at least one upper and lower valve systems, during a second period of time different from said first period of time, so as to draw the air outside the modular building structure through the at least one lower valve system into the air chamber layer and to expel the ascending air from the air chamber layer to outside the modular building structure through the at least one upper valve system.

In an embodiment, the method further comprises the step of operating the at least one upper and lower valve systems, during a second period of time different from said first period of time, so as to draw the air inside the interior into the air chamber layer through the at least one lower valve system and to expel the ascending air from the air chamber layer to outside the modular building structure through the at least one upper valve system while the interior is in fluid communication with the air outside the modular building structure through the at least one lower valve system.

BRIEF DESCRIPTION OF THE DRAWINGS

The invention will be better understood with the aid of the description of several embodiments given byway of examples and illustrated by the figures, in which:

FIG. 21a to 21d show cross-sectional views of the lower valve system of FIG. 20 according to different configurations for regulating the thermal conditions inside the modular building structure.

DETAILED DESCRIPTION OF SEVERAL EMBODIMENTS OF THE INVENTION

Figure 3:
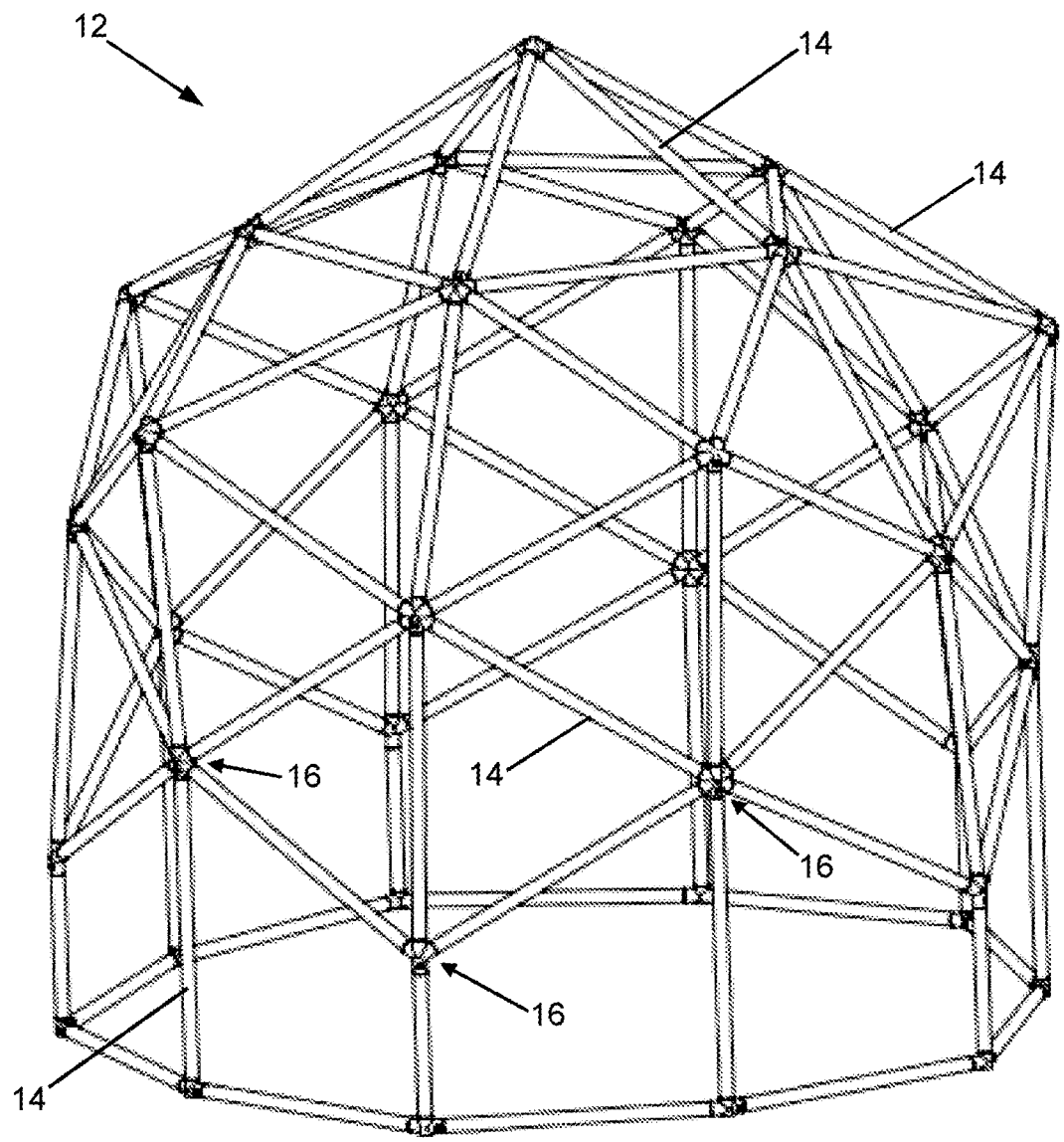
FIG. 3 shows a perspective view of a framework of a modular building structure according to another embodiment.

According to an embodiment and with reference to FIGS. 1-4, the modular building structure 10 comprises a plurality of panels 20 which are connected to each other by means of a connecting interface 34. These panels are supported by a framework 12 as shown in FIG. 3 which comprises a plurality of rods 14, for example aluminium rods, interconnected by hub connectors 16.

Figure 5:
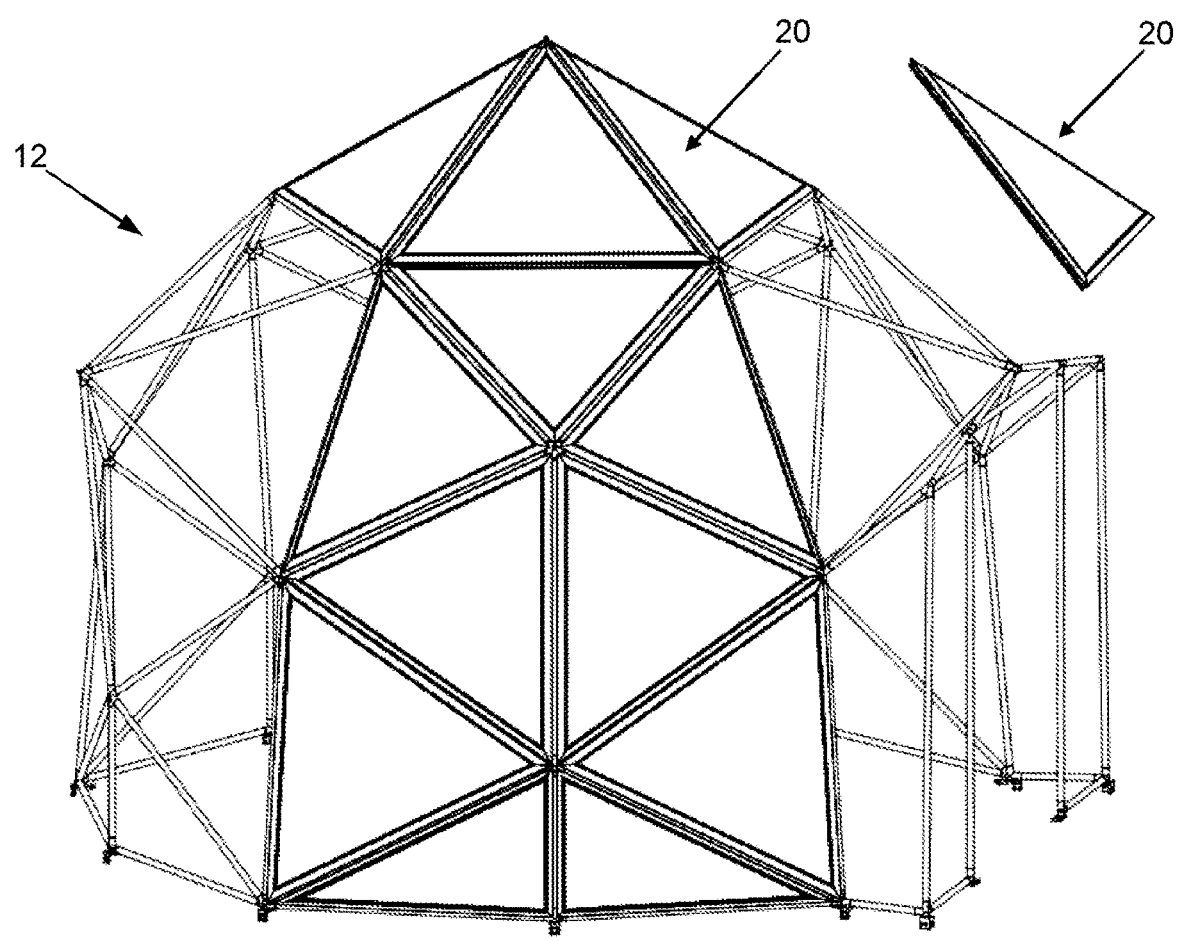
FIG. 5 shows a similar view of the framework of FIG. 3 with some panels attached to the framework.

The configuration of the framework 12 depends on the shape of the panels. In the illustrated embodiment of FIG. 3, the rods 14 are connected to each other in a way to form a plurality of triangular cavities inside which triangular panels are mounted as shown in FIG. 5. The configuration of the framework 12 may be adapted to support other shapes of panels such as square, rectangular, pentagonal, hexagonal or any other regular or irregular polygonal shape. The modular building structure 10 may be used as a greenhouse and may include a hydroponic system.

Figure 4:
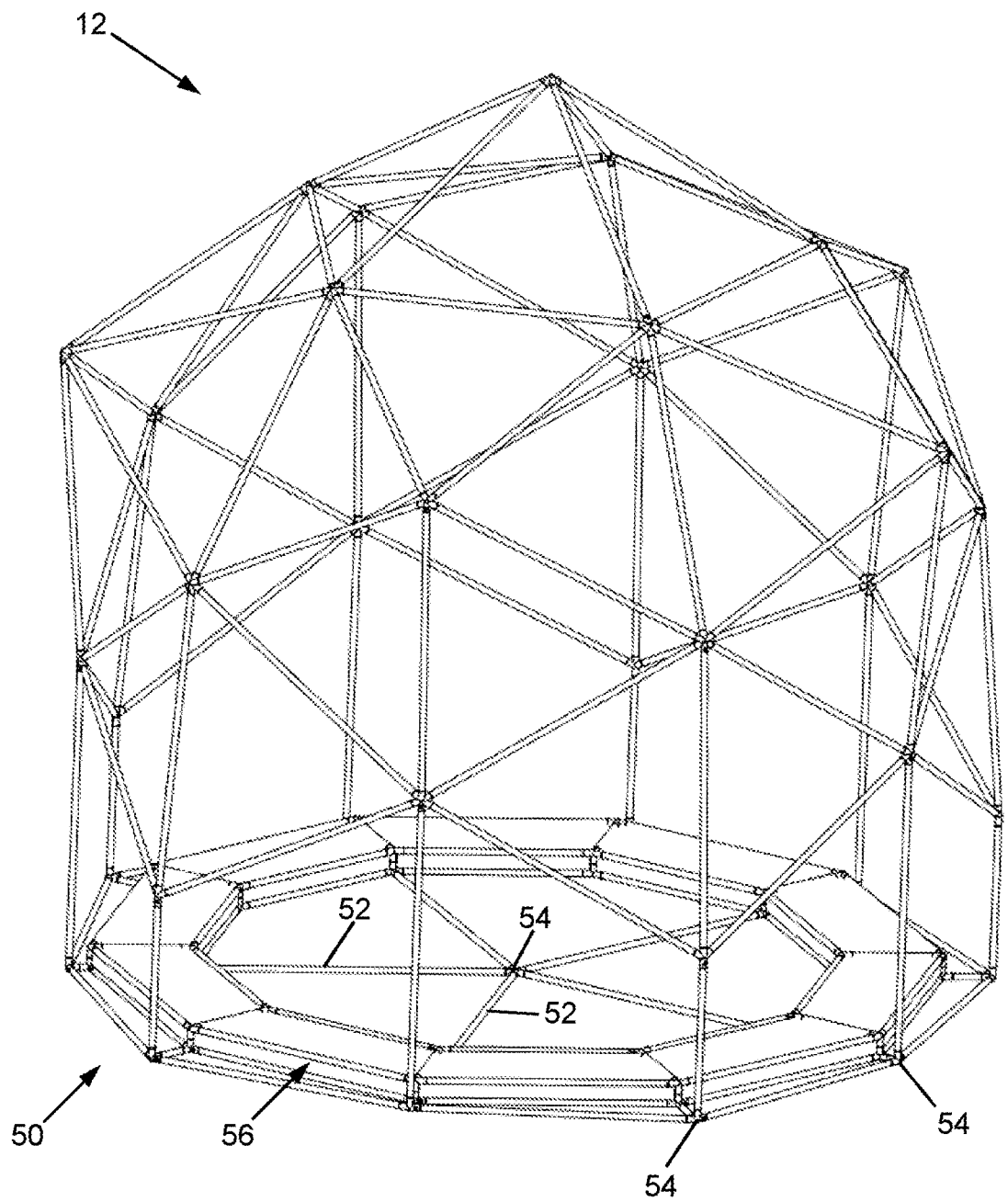
FIG. 4 shows the framework of FIG. 3 connected to a base structure.

With reference to FIG. 4, the framework 12 is connected to a base 50 comprising a plurality of bars 52 and connectors 54 to interconnect the plurality of bars 52 together in a horizontal plane. Some extremities of these bars 52 are connected to the rods 14 of the framework 12. In order to bring stability to the modular building structure 10, one or more slabs or water tanks 56 filled with liquid are mounted on the base 50 of the modular building structure, for example on its central portion and/or along its periphery.

Figure 6:
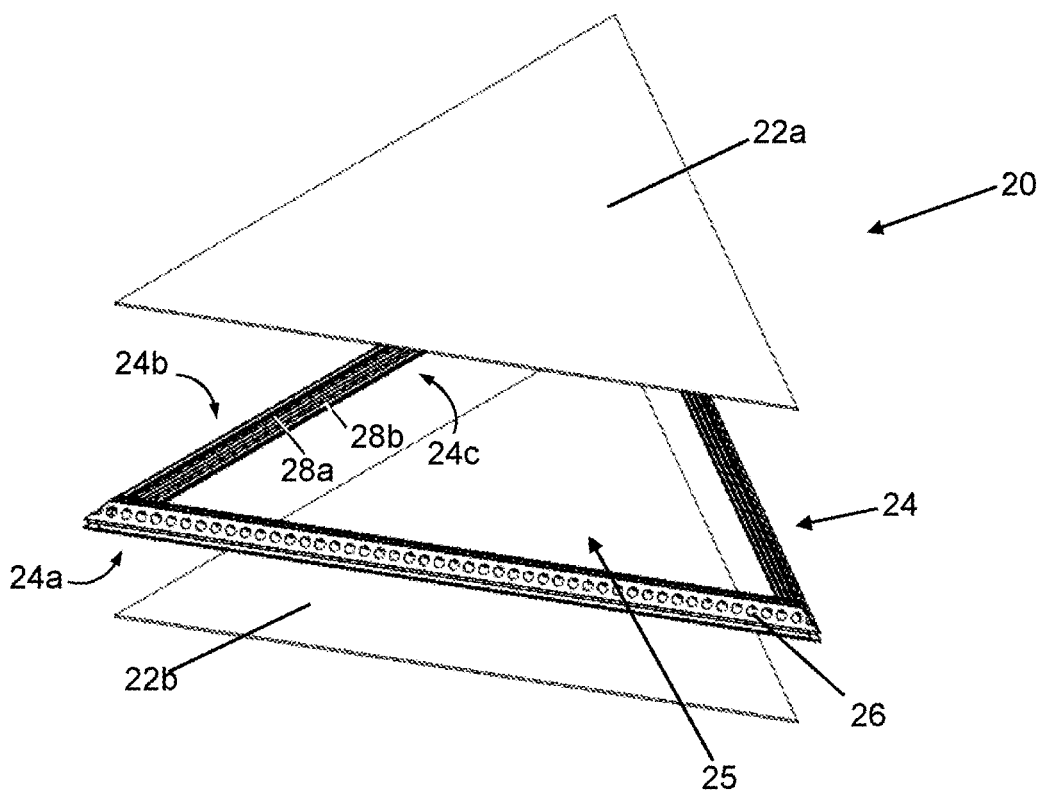
FIG. 6 shows an exploded view of a panel of FIG. 5.

As shown in FIG. 6, each panel 20 of the modular building structure comprises a triangular frame 24, a triangular outer pane 22a and a triangular inner pane 22b. The outer and inner pane 22a, 22b may be for example a PMMA glass (acrylic glass). Each side of the outer pane 22a is mounted inside a first longitudinal groove 28a disposed near the upper side 24b of the frame 24 while each side of the inner pane 22b is mounted inside a second longitudinal groove 28b disposed near the lower side 24a of the frame. An air space is thus created between the outer and inner panes 22a, 22b once the outer and inner panes 22a, 22b and the frame 24 are assembled together. Each side of the rectangular frame 24 comprise one or more apertures 26 extending from the air space 25 to an outer surface of the frame 24.

In other embodiments, the framework 12 may have different shapes to hold any shape of panel as described above.

The inner panes 22b of all the panels 20 connected to each other define an interior 40 while the air space 25 of each panel 20 is in fluid communication with the air space of every adjacent panel to create an air chamber layer 44 (cf. FIGS. 18a-18f) as described in detail below. The air chamber layer 44 covers substantially the entire outer surface of the interior 40. In another embodiment, the air chamber layer may cover only a portion of the outer surface of the interior 40.

Figure 1:
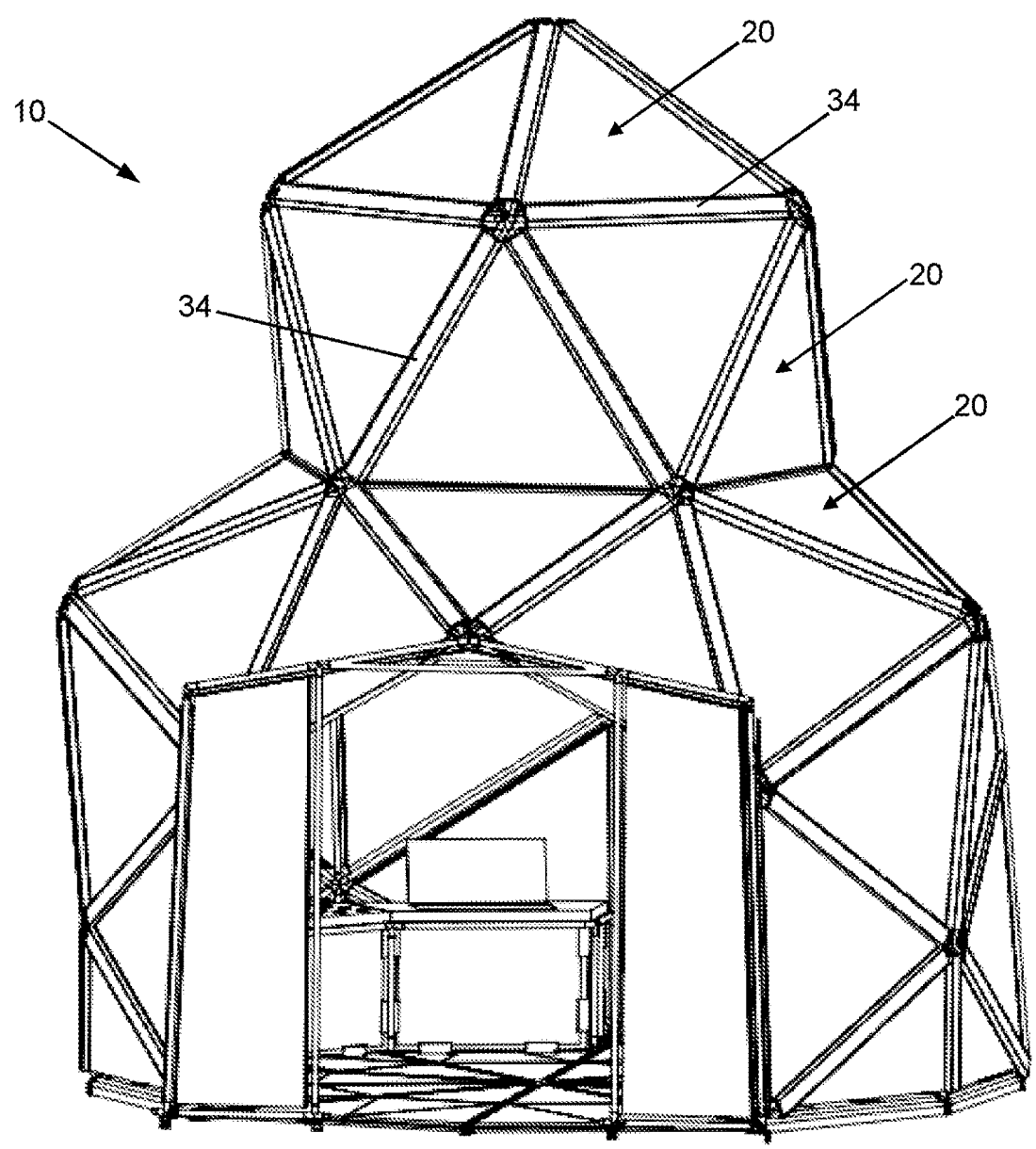
FIG. 1 shows a perspective view of a modular building structure according to an embodiment.
Figure 2:
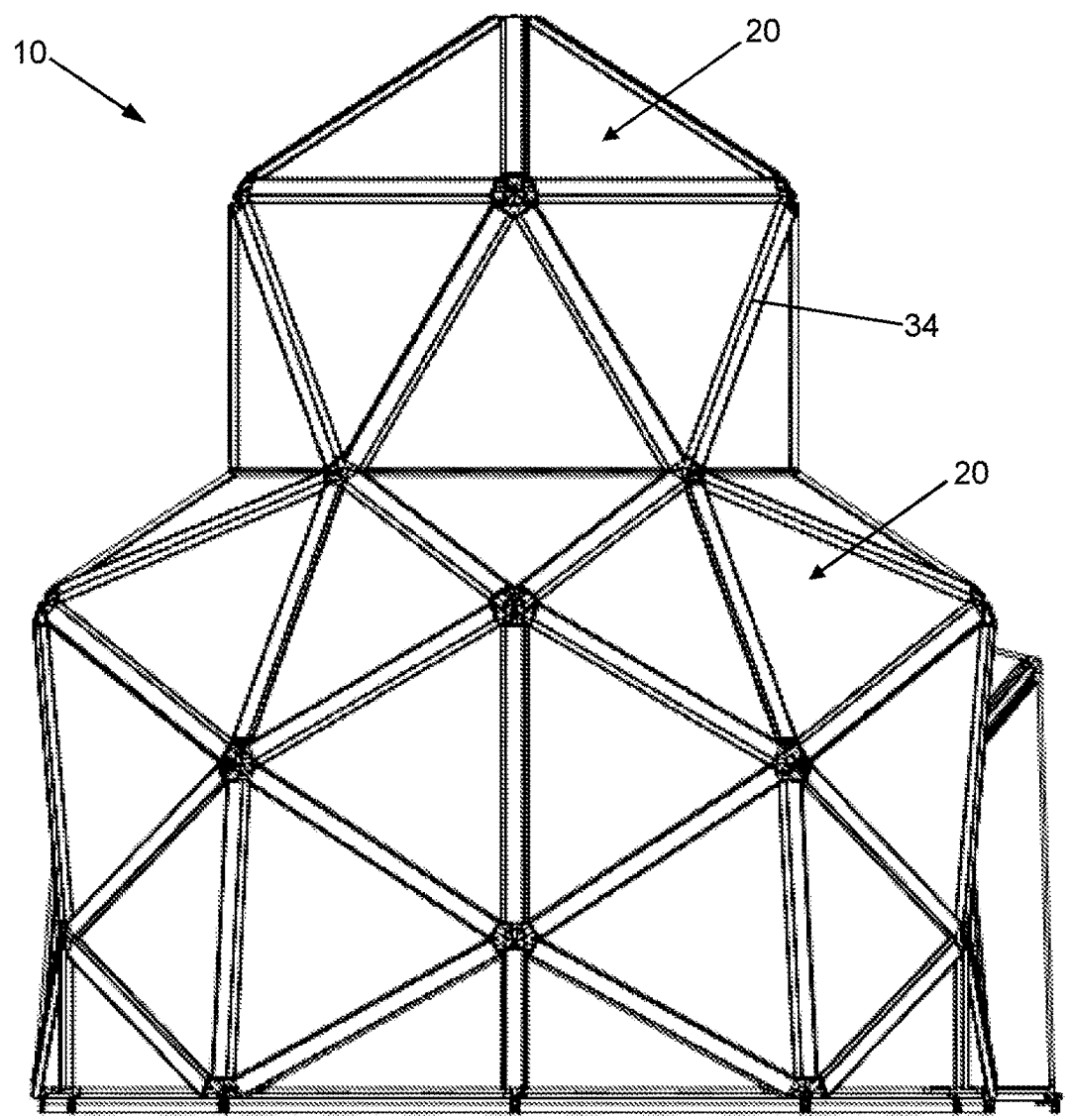
FIG. 2 shows a perspective view of the modular building structure of FIG. 1 from another angle.

The modular building structure 10 may comprise one or more doors 60 as shown in FIG. 1. These doors may be for example regular doors with a single glass. The sides of the frames of panels which are adjacent to the doors are therefore sealed such that the air chamber layer circumvents the doors. In a non-illustrated embodiment, the modular building structure may also comprise one or more regular windows. As for the doors, the sides of the frames of the panels which are adjacent to a window are sealed such that the air chamber layer circumvents the window.

Figure 7:
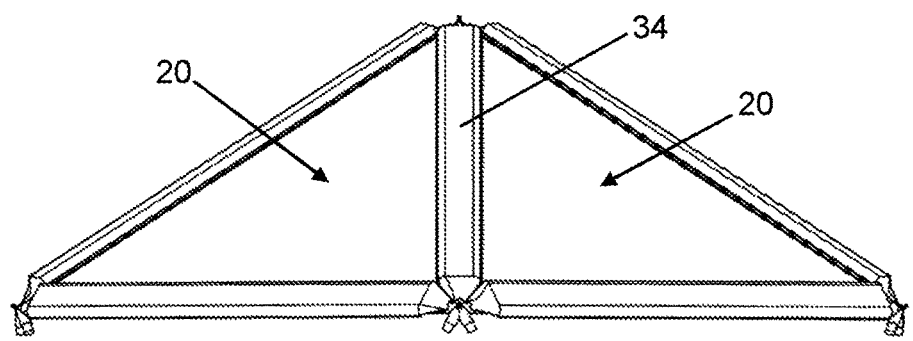
FIG. 7 shows a perspective view of two modules comprising two adjacent panels mounted inside two adjacent cavities of the framework of FIG. 3 and a structure to fix the panels to the framework and to adjacent panels.

FIG. 7 shows a perspective view of two modules comprising two adjacent panels 20 mounted inside two adjacent cavities of the framework of FIG. 3 and a structure to fix the panels to the framework and to adjacent panels.

Figure 8:
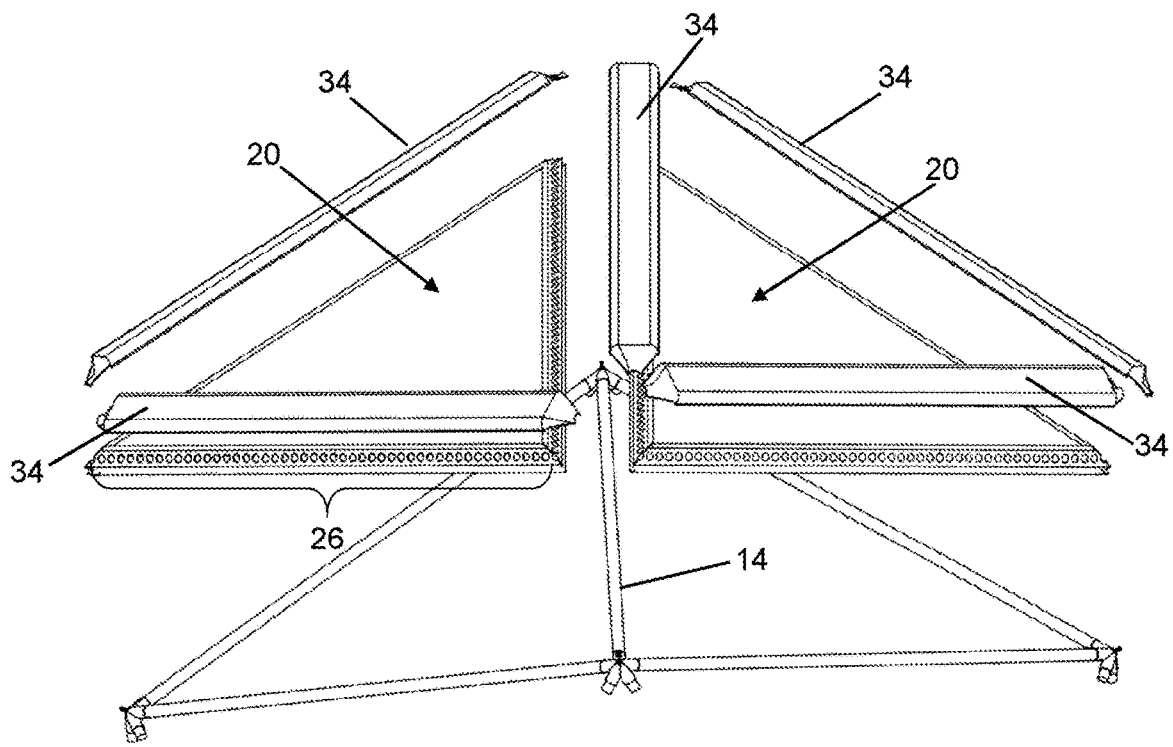
FIG. 8 shows an exploded view of FIG. 7.
Figure 9:
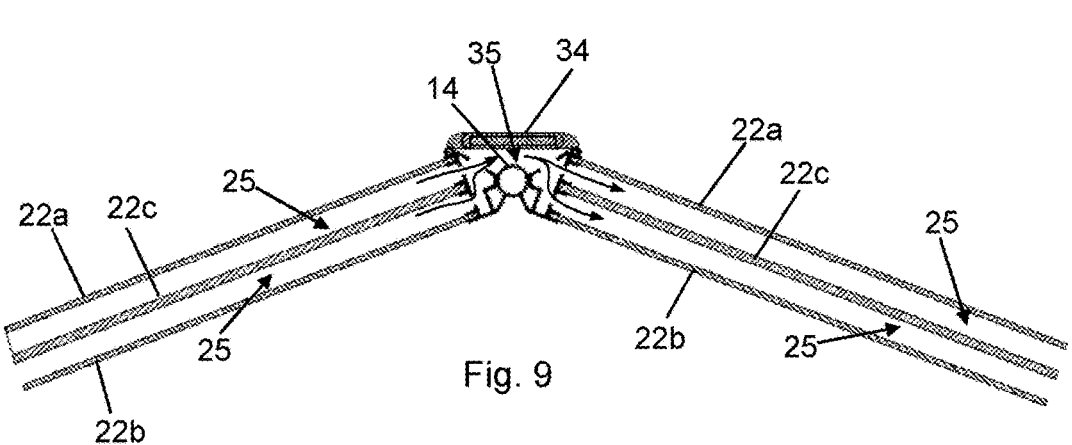
FIG. 9 shows a cross-sectional view of two adjacent modules.
Figure 9A:
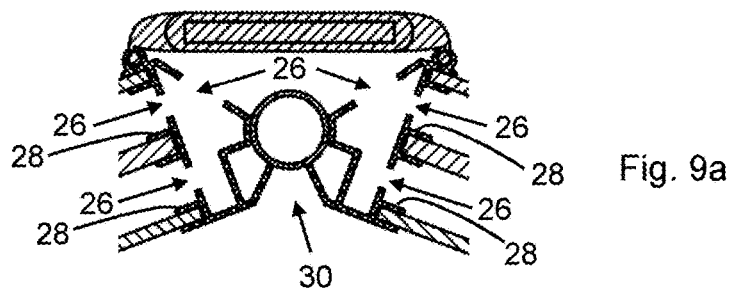
FIG. 9a shows an enlarged view of the connecting structure between the two adjacent panels of FIG. 9.
Figure 10:
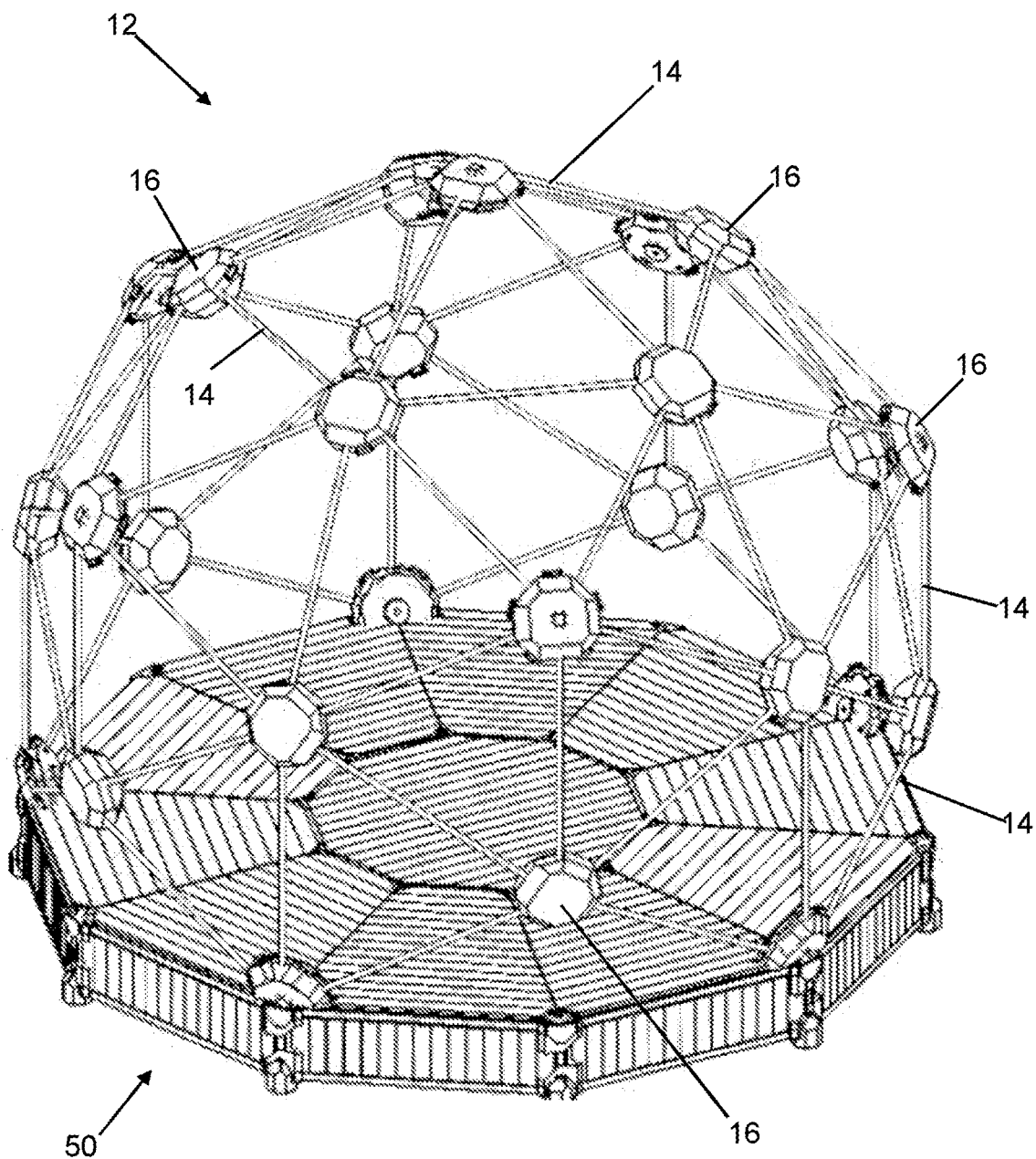
FIG. 10 shows a perspective view of a modular building structure without the panels according to another embodiment.

With reference to FIGS. 8 and 9, two adjacent triangular panels 20 are connected together by a connecting interface 34 to create a sealed cavity in fluid communication with respective air space 25 of adjacent panels 20 through the apertures 26 of respective adjacent frame. Adjacent frames 24 formed together a rod receiving part 30 into which respective rod 14 of the framework 12 is mounted to fix the panels 20 to the framework 12.

In an embodiment, at least one intermediate pane 22c may be mounted between the outer and inner panes 22a, 22b. The at least one intermediate pane 22c of some or each panel of the modular building structure 10 may be for example a glass configured to change from transparent to translucent or opaque and vice versa when a voltage is applied to the glass. The outer pane 22a and/or the inner pane 22b of some or each panel of the modular building structure may also be a glass configured to change appearance as described above according to some embodiments.

The glass may therefore be electrically connected to a power source and to a control unit in order to control the appearance of the glass. Some or each panel of the modular building structure 10 may therefore block the incident light so as to shade a portion of the interior 40 of the structure 10 when the outer pane 22a and/or the inner pane 22b and/or the intermediate pane 22c is electrically controlled to become opaque.

In another embodiment, the at least one intermediate pane 22c of some or each panel 20 of the modular building structure 10 may be a solar panel electrically connected to a battery (not shown) in order to store the electricity produced by the solar panels. The outer pane 22a and/or the inner pane 22b of some or each panel 20 may also be a solar panel to increase the production of electricity. In other embodiments, the outer pane 22b and/or the inner pane 22a and/or one or more intermediate panes 22c of some or each panel 20 of the modular building structure 10 may be selected between a solar cell panel, a photovoltaic/thermal (PVT) panel, a thermal collector panel, a heated glass, a smart glass, an insulating panel and a transparent panel/pane.

Figure 12:
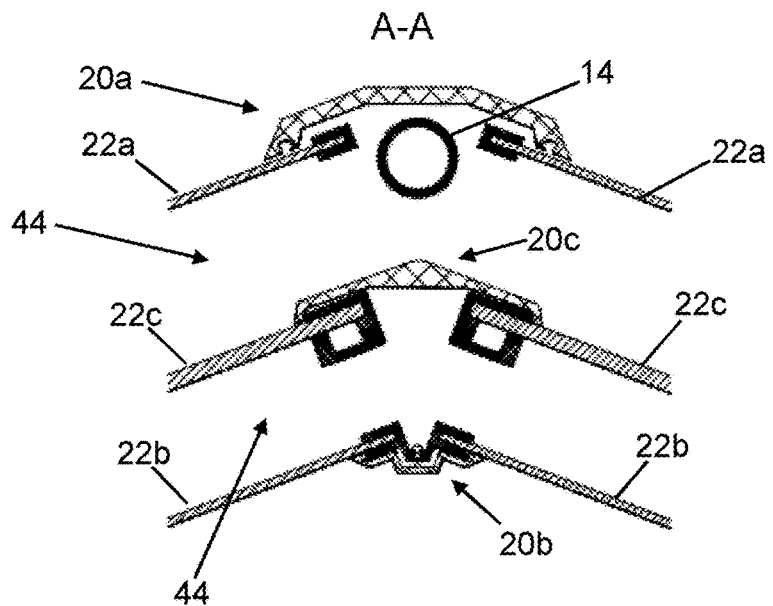
FIG. 12 shows a cross-sectional view of FIG. 11 along the line A-A.
Figure 13:
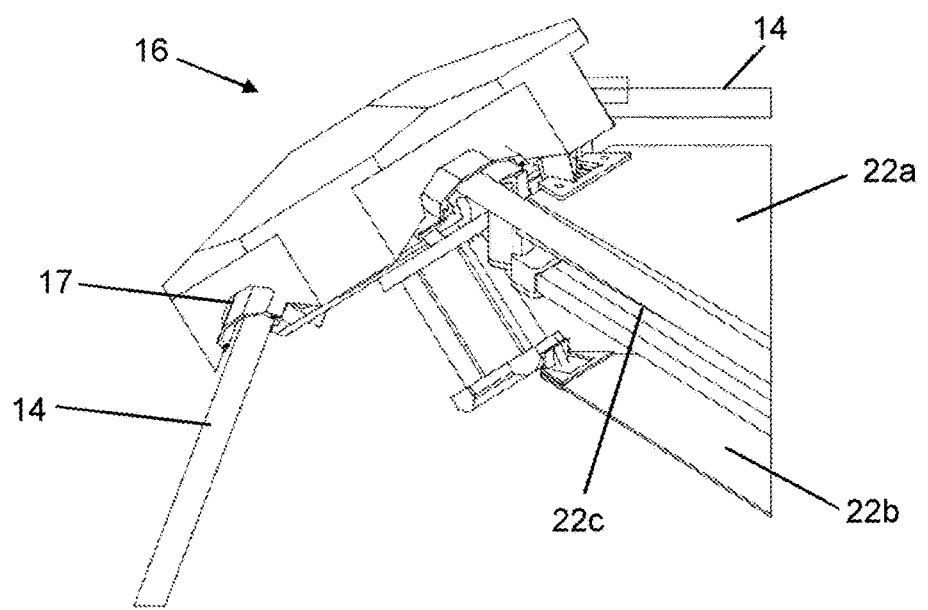
FIG. 13 shows a perspective view of a hub connector of FIGS. 10 and 11 with partial view of the outer, inner and intermediate panes connected to the hub connector.
Figure 14:
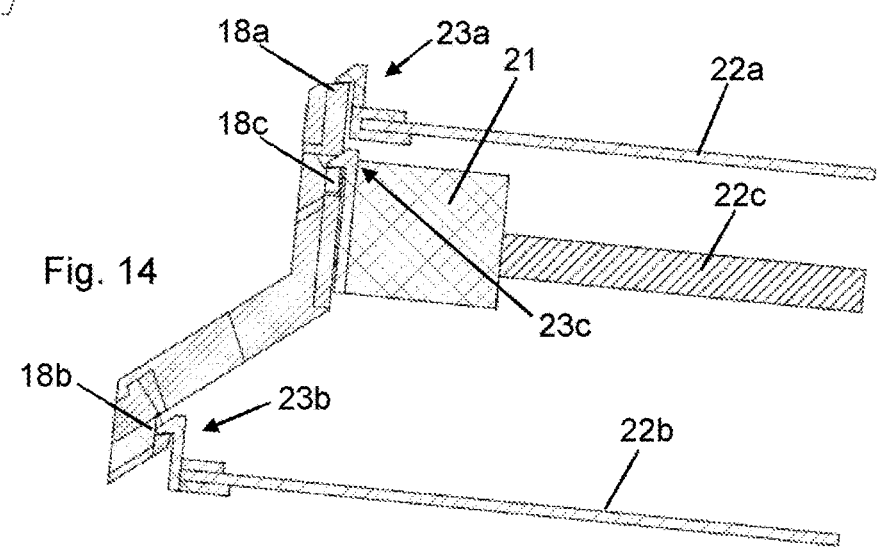
FIG. 14 shows a cross-sectional view of FIG. 13.
Figure 15:
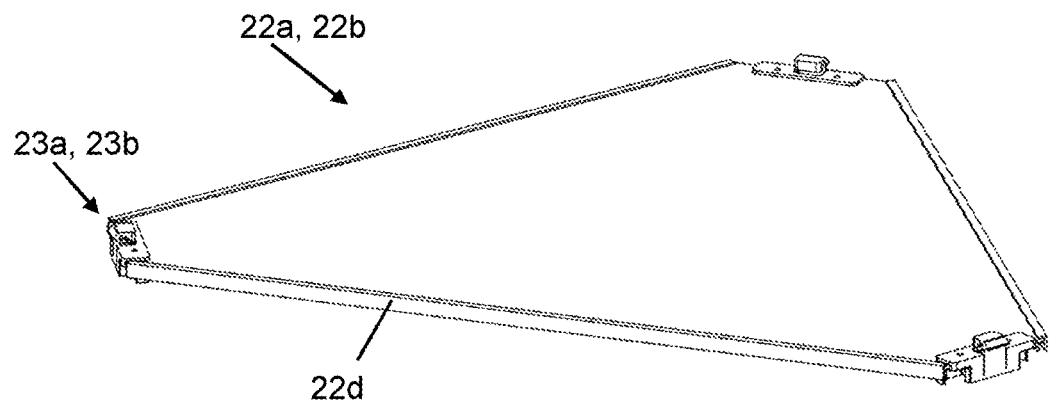
FIG. 15 shows a perspective view of a pane of a panel.
Figure 16:
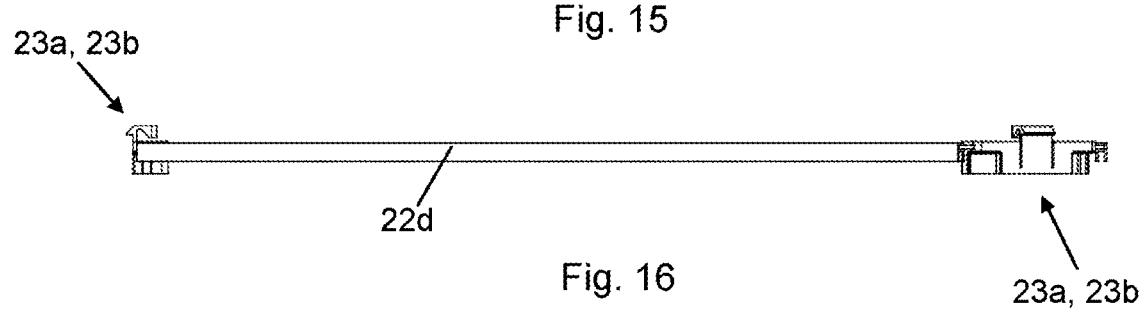
FIG. 16 shows a side view of FIG. 15.

According to another embodiment as shown in particular in FIGS. 10 to 16, each or some panels 20 of the modular building structure 10 comprise at least an outer pane 22a and an inner pane 22b. As shown in FIGS. 14-16, the outer and inner panes 22a, 22b comprise each several pane connectors 23a, 23b. The pane connectors 23a, 23b of the outer and inner panes 22a, 22b are each mounted on a converging portion of two rectilinear sides of the outer and inner panes 22a, 22b respectively as shown in particular in FIG. 15.

As for the embodiment shown in FIGS. 1 to 9a, the panels may comprise at least one intermediate pane 22c. The outer pane 22a and/or the inner pane 22b and/or the at least intermediate pane 22c may be selected between a solar cell panel, a photovoltaic/thermal (PVT) panel, a thermal collector panel, a heated glass, a smart glass, an insulating panel and a transparent panel/pane.

In case, the outer pane 22a and/or the inner pane 22b and/or the at least one intermediate pane 22c is/are a smart glass configured to change from transparent to translucent or opaque and vice versa, the glass is electrically connected to a power source and a control unit to control the appearance of the smart glass. Each panel 20 may comprise an electrical connection module 21, as shown in FIG. 14, to electrically interconnect adjacent intermediate panels such as solar cell panels, photovoltaic/thermal (PVT) panels, heated glasses, and smart glasses. Each panel 20 may comprise additional connection modules (not shown) to electrically interconnect adjacent outer panes 22a and/or adjacent inner panes 22b.

Each of the outer pane 22a, the inner pane 22b and the intermediate pane 22c, if any, of a panel 20 comprise a protective frame 22d as shown in particular in FIGS. 12 and 15.

Figure 11:
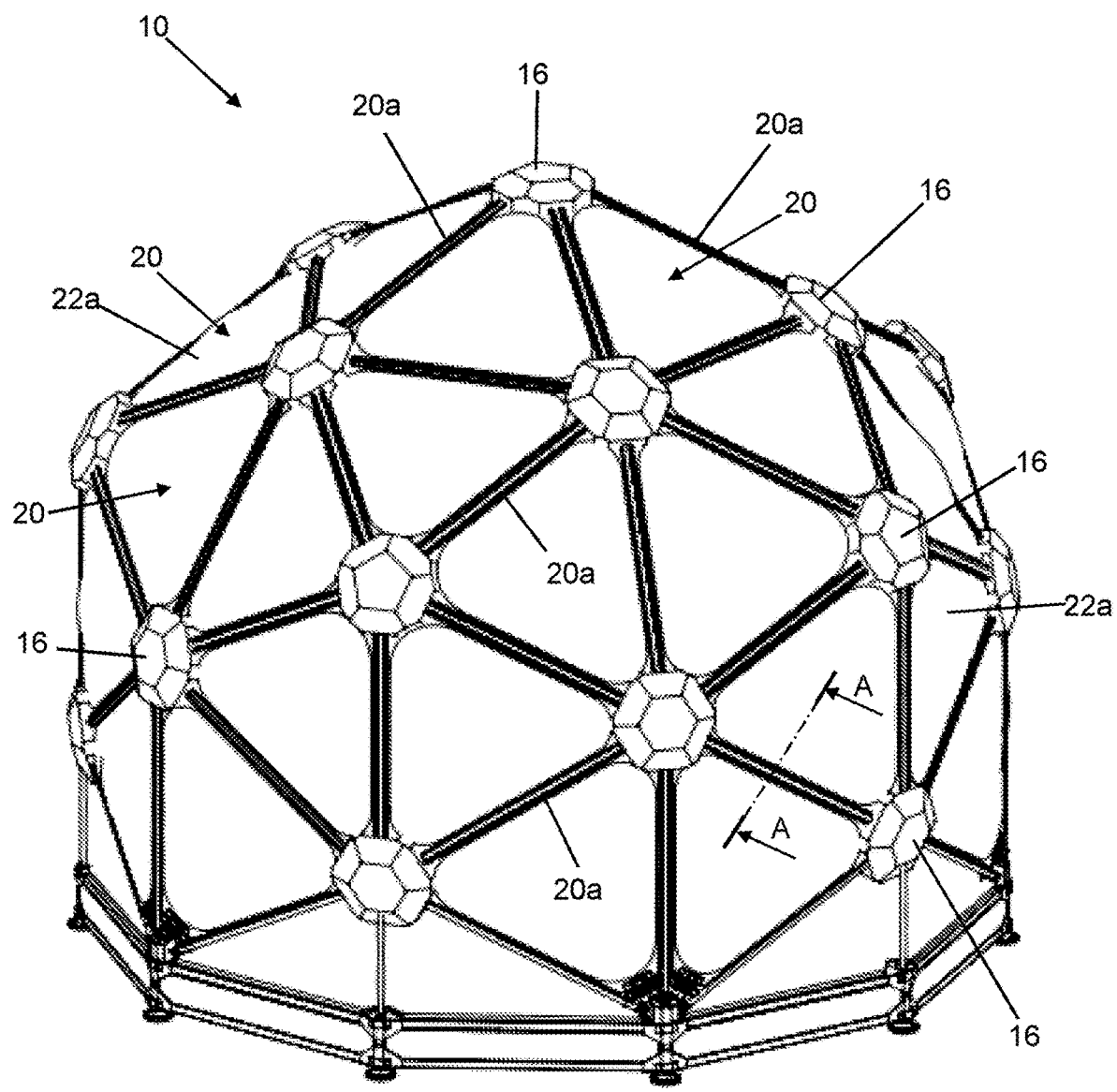
FIG. 11 shows a similar view of FIG. 10 with the panels.

With reference to FIGS. 11, 13-14, the pane connectors 23a of each outer pane 22a are connected to corresponding outer pane connecting parts 18a of different hub connectors 16 while the pane connectors 23b of each inner pane 22b of the same panel 20 are connected to corresponding inner pane connecting parts 18b of the same of said different hub connectors 16. The hub connectors 16 also comprise rod connecting parts 17 to interconnect the hub connectors with a plurality of rods 14 to erect the framework 12.

Referring to FIG. 12, a first, a second, and a third connecting interface 20a, 20b, 20c are mounted to connect together respectively the outer panes 22a, the inner panes 22b, and the intermediate pane 22c of any two adjacent panels 20 in order to create the air chamber layer 44. The first, the second and the third connecting interfaces 20a, 20b, 20c therefore create a panel 20 which comprises an inner space which is in air communication with an inner space of any adjacent panel as particularly shown in FIG. 11 (only connecting interfaces 20a are visible in this figure).

Although, in the illustrated embodiment of FIGS. 10 to 16, the panels 20 have a triangle shape having three sides, the number of sides of each panel may vary according to the chosen design for the modular building structure. The outer pane and the inner pane of the panels may therefore comprise N rectilinear sides. In this configuration, the outer pane and the inner pane comprise respectively N outer pane connectors and N inner pane connectors mounted on converging portion of two rectilinear sides of the outer pane and the inner pane respectively. N may be for example a number selected between 4 and 8.

This particular embodiment has the advantage to facilitate the construction of the modular building structure 10 since the outer pane 22a, the inner pane 22b, and the intermediate pane 22c, if any, may simply be hung from the inside of the framework 12 once erected with the aid of a ladder.

Figure 17:
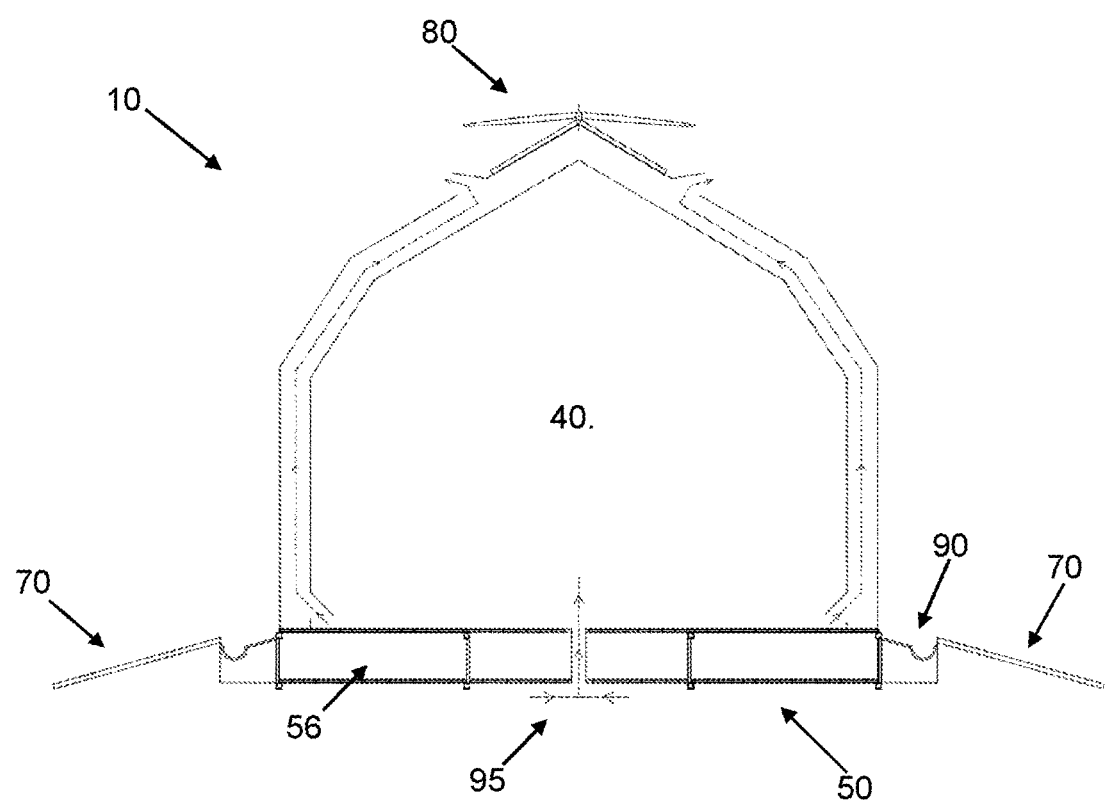
FIG. 17 shows a cross-sectional view of a modular building structure according to an embodiment.

FIG. 17 shows a self-sufficient modular building structure 10 comprising solar panels 70 and a windmill 80 for producing electricity, a gutter 90 for water harvesting, a water tank 56 for storing water and a ground cooling channel 95 extending from the base 50 and in air communication with the ground and the interior 40 in order to introduce into the interior 40 a cool air.

The modular building structure 10 according to any of the above embodiment comprises one or more upper and lower valve systems 46a, 46b as shown in FIGS. 18a to 18e. Several valve systems may be mounted along the perimeter of the upper and lower portion of the modular building structure 10 to regulate the thermal conditions inside the interior 40. For example, for a modular building structure comprising a decagon-shaped base 50 as shown for instance in FIG. 10, a lower valve system 46b may be mounted on each side of the base for a total of ten valve systems and a corresponding number of upper valve systems 46a may be mounted on the upper part of the modular building structure.

The upper and lower valve systems 46a, 46b comprises several flaps which will described in detail subsequently according to a preferred embodiment, whereby the valves systems integrate a heat exchanger for optimized thermal regulation. The upper and lower valve systems 46a, 46b may be manually or electrically actuated. In the latter case, a first weather sensor such as a temperature or a humidity sensor may be mounted inside the interior 40 and a second weather sensor may be mounted outside the modular building structure. These weather sensors may communicate with a control unit comprising a processor configured to execute a program to selectively actuate the upper and lower valve systems by actuating means based on the output of the first and second weather sensors in order to reach a desired thermal comfort inside the interior 40.

Figures 18A, 18B:
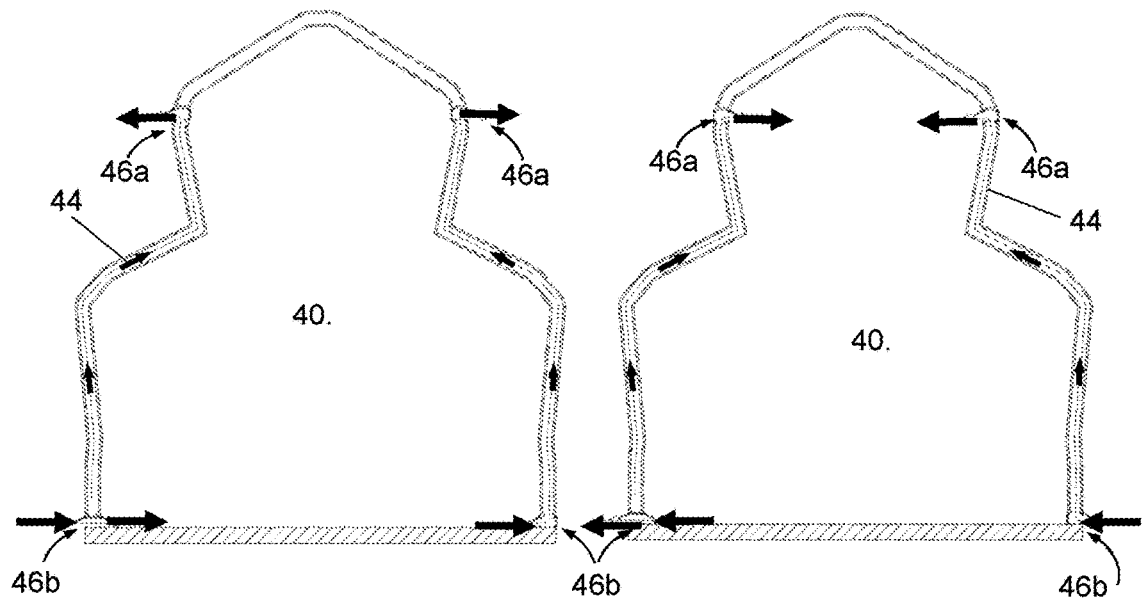
FIGS. 18a to 18f show schematic cross-sectional views of the modular building structure with upper and lower valve systems in different configurations according to different settings for regulating the thermal conditions inside the modular building structure.

FIG. 18a shows the position of flaps of the upper and lower valve systems 46a, 46b in a cooling and air renewal setting. In this setting, the air inside the modular building structure is drawn through the lower valve system 46b into the air chamber layer 44 and the ascending air along the air chamber layer 44 is expelled from the air chamber layer 44 to outside the modular building structure through the upper valve system 46a while the interior 40 is in fluid communication with the air outside the modular building structure through the lower valve system 46b. The cooling and air renewal setting may be used preferably in summer days with moderate temperatures.

FIG. 18b shows the position of the flaps of the upper and lower valve systems 46a, 46b in a heating and air renewal setting. In this setting, cold air outside the modular building structure is drawn through the lower valve system 46b into the air chamber layer 44 and the ascending air driven along the air chamber layer 44, thanks to pressure drop, is heated up due to the greenhouse effect and is then expelled from the air chamber layer 44 into the interior 40 through the upper valve system 46a while the interior 40 is in fluid communication with the air outside the modular building structure through the lower valve system 46b. The heating and air renewal setting may be used preferably in cold winter days.

Figures 18C, 18D:
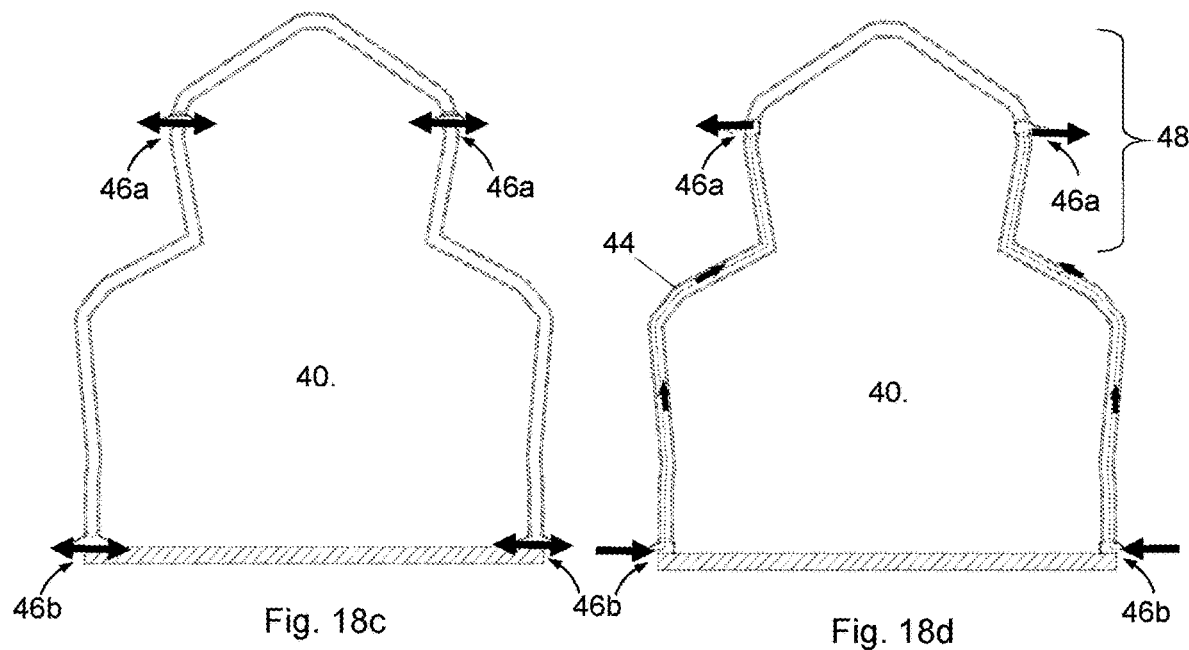

FIG. 18c shows the position of the flaps of the upper and lower valve systems 46a, 46b in an equilibrium and air renewal setting to create a first and a second air communication between the air outside the modular building structure 10 and respectively an upper part and a lower part of the interior 40 through respectively the upper and lower valve systems 46a, 46b. According to this setting, the temperature in interior 40 of the modular building structure will adjust to the outside temperature thereby avoiding any heating from the air chamber layer. The equilibrium and air renewal setting may be used preferably in hot summer days.

FIG. 18d shows the positions of the flaps of the upper and lower valve systems 46a, 46b in a cooling setting, whereby the lower and upper end of the air chamber layer 44 are in fluid communication with the air outside the modular building structure 10, while the interior 40 of the structure is sealed from the outside.

In such setting, the air outside the modular building structure 10 is drawn in the lower portion of the air chamber layer 44 and is driven upwards inside the air chamber layer 44 through a positive buoyance force. In this cooling setting, the air from the air chamber layer 44 is heated by greenhouse effect, expelled and renewed with fresh air thanks to pressure drop. The cooling setting may be used preferably in summer days with moderate temperatures.

The modular building structure 10 may comprise a chimney 48 to increase the height of the building structure 10 and the buoyance force in order to speed up the air circulation in the air chamber layer 44 for a more efficient convective heat transfer. The modular building structure according to other embodiments may comprise a second level (attic design) to increase the height of the building structure 10 and the buoyancy force.

Figures 18E, 18F:
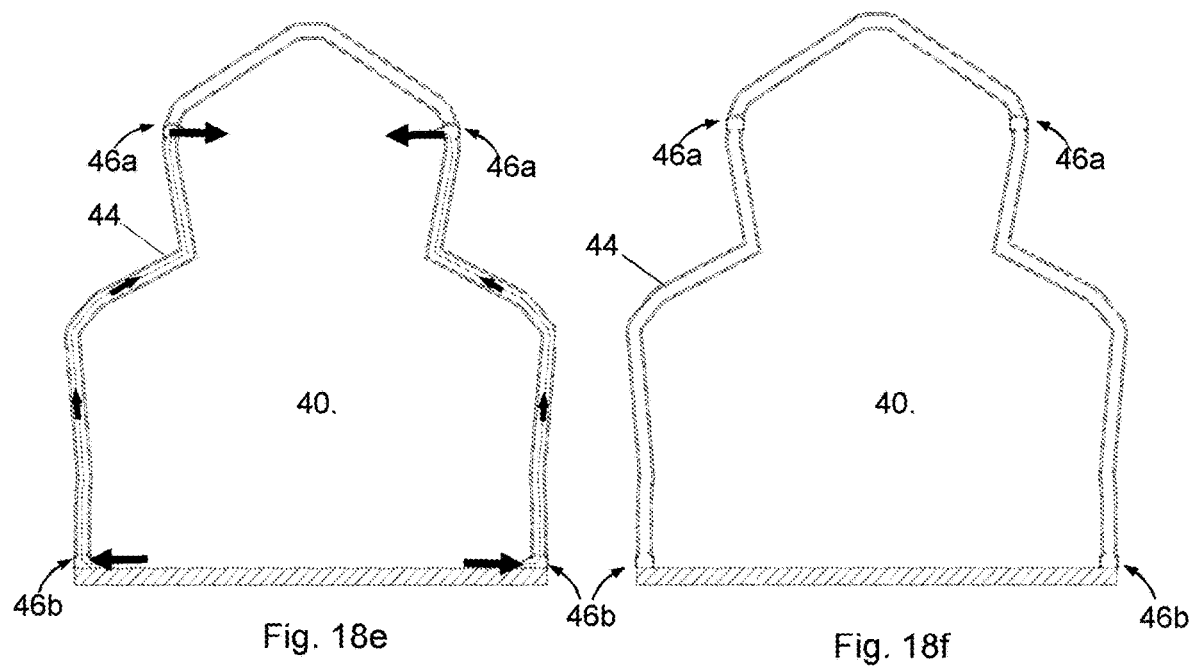

FIG. 18e shows the position of the flaps of the upper and lower valve systems 46a, 46b in a heating setting, whereby the lower and upper end of the air chamber layer 44 are in fluid communication with the air inside the interior 40, while the interior 40 is sealed from the outside. In this cooling setting, ascending cold air in the air chamber layer will be heated thanks to the greenhouse effect and expelled into the interior 40 due to the pressure drop. The heating seating may be used preferably in cold sunny winter days.

FIG. 18f shows the position of the flaps of the upper and lower valve systems 46a, 46b in a stabilization setting, whereby the air chamber layer 44 and the interior 40 of the structure are sealed from the outside. In this setting, the air chamber layer 44 acts as an insulator layer to protect the interior against cold temperatures outside. The stabilization setting may be used preferably during the night.

Figure 19:
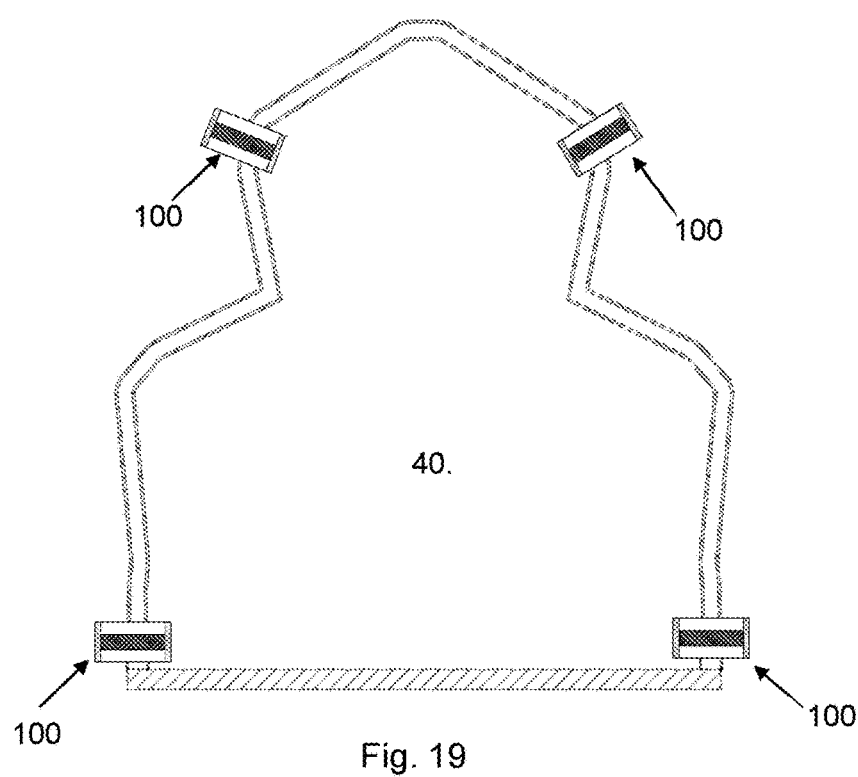
FIG. 19 shows a schematic cross-sectional view of the modular building structure comprising upper and lower valve systems with heat exchangers for optimized thermal regulation in the interior of the structure.

In an advantageous embodiment, the modular building structure as shown in FIG. 19 comprises upper and lower valve systems with heat exchangers 100 adapted to efficiently regulate the thermal conditions inside the interior 40 of the structure as a function of the thermal conditions outside and a desired temperature in the interior 40.

Figure 20:
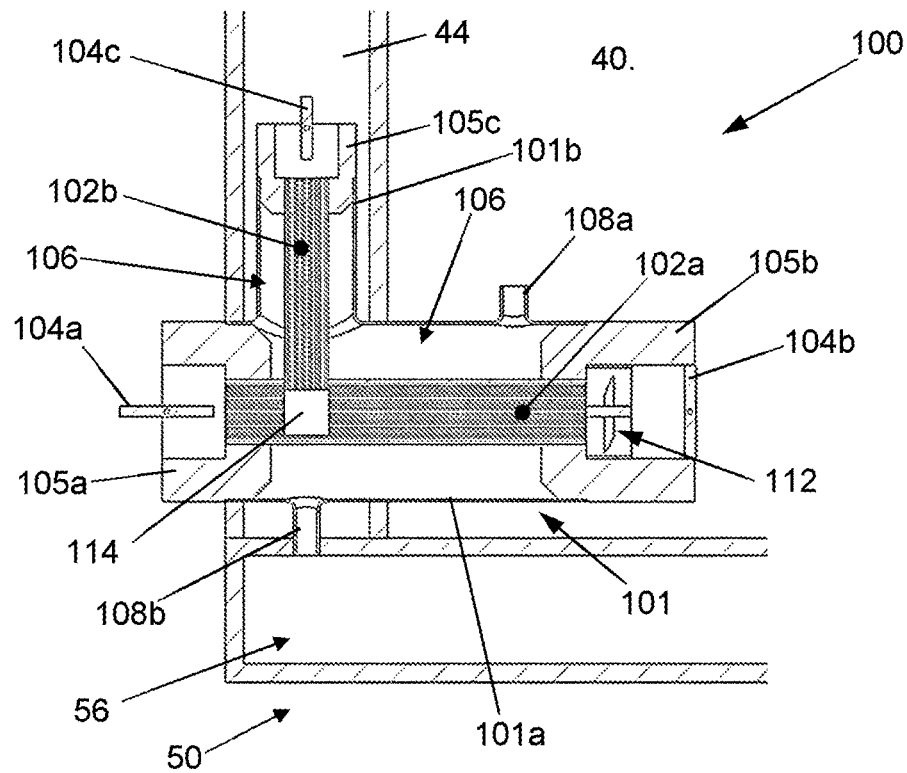
FIG. 20 shows a detailed cross-sectional view of the lower valve system comprising a heat exchanger.

With reference to FIG. 20, the valve system with heat exchanger 100 is adapted to be arranged on a lower part of the modular building structure. The valve system 100 comprises a housing 101 having a first body part 101a and second body part 101b forming an integral part with the first body part and extending perpendicularly therefrom. The first body part 101a is mounted to extend from the outside into the interior 40 while the second body part 101b is arranged inside a lower portion of the air chamber layer 44. A first and a second core 102a, 102b, made of hydrophilic porous material such as ceramic, are arranged on respective first and second body parts 101a, 101b. The first and second core 102a, 102b may have for example a cylindrical shape and may advantageously be made of ceramic having a honeycomb structure to increase surfaces for increased thermal exchanges.

The first and second cores 102a, 102b are arranged with respect to each other to form an air cavity 114 for allowing air communication between these first and second cores. The first body part 101a of the housing 101 defines a water chamber 106, which may have for example an annular shape, around the first core 102a. The water chamber 106 comprises an inlet 108a and an outlet 108b in fluid communication with the water tank 56 of the modular building structure as described previously, via a closed loop water circuit (not shown) comprising a pump system connected to the inlet and outlet 108a, 108b of the water chamber 106. Water may therefore be drawn from the water tank 56 through the inlet 108a to flow into the bottom part of the water chamber 106 to partially soak the first core 102a. The first and second core 102a, 102b are in contact to ensure that the second core 102b is partially soaked with water as the latter may be drawn by capillarity from the first core 102a into the second core 102b through their contact interface. Air may therefore still flow through the first and second core 102a, 102b as they are not entirely soaked with water. Depending on the different settings described above, the water tank 56 may be filled with hot or cold water. In a non-illustrated embodiment, the modular building structure may comprise a first and a second water tank filled respectively with hot and cold water. The valve system with heat exchanger may be arranged to be selectively in fluid communication with the first or the second water tank according to the setting.

The valve system 100 comprises an outside flap 104a, an inside flap 104b and an air chamber flap 104c pivotably mounted inside respective first, second and third flap housing parts 105a, 105b, 105c defining an opening in fluid communication with respective first and second cores 102a, 102b. Each flap 104a, 104b, 105b is arranged to be electrically actuated to be brought from an open configuration to a closed configuration and vice versa. In the open configuration, air may circulate through the opening defined by respective flap housing parts 105a, 105b and 105c while in the closed configuration the flap seals the opening to prevent air from circulating through the opening.

The valve system may further comprise a fan 112 mounted between the first core 102a and the inside flap 104b. The fan 112 is either turned off for a setting with passive cooling/heating or turned on in the scenario where a faster and/or a more effective cooling/heating of the interior 40 of the building structure is needed.

Figure 21A:
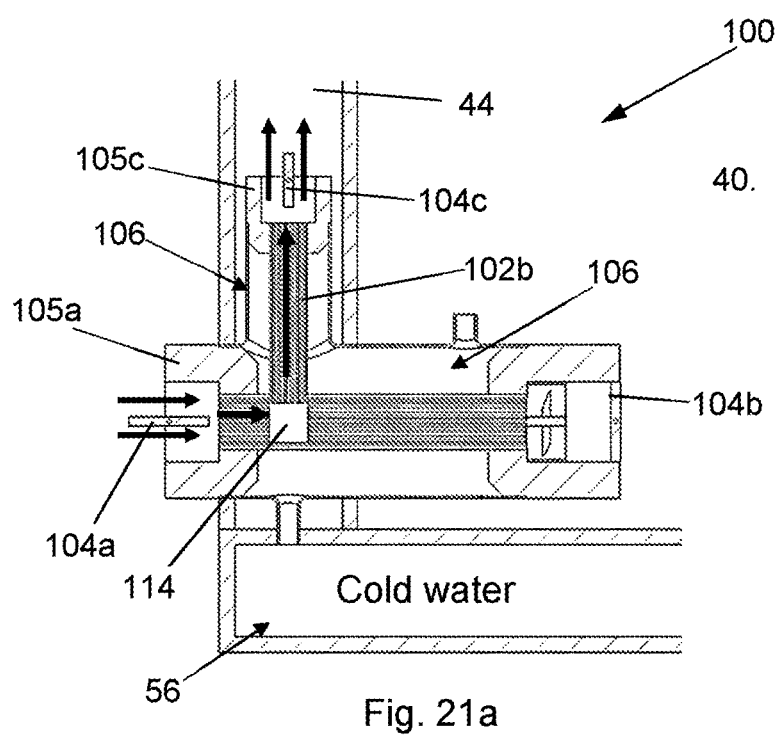

FIG. 21a shows the valve system with heat exchanger 100 in a cooling configuration to achieve the cooling setting shown in FIG. 18d. The water tank 56 is filled with cold water and is in fluid communication with the water chamber 106 of the valve system 100, via the closed loop water circuit so that the first and second core 102a, 102b are partially soaked with cold water. The outside flap 104a and the air chamber flap 104c are operated to bring the outside air in fluid communication with the air chamber layer 44 while the inside flap 104b is operated to prevent air from entering the interior of the modular building structure. The air may therefore flow from the outside through successively the opening of the housing part 105a, a portion of the first core 102a, the air cavity 114, the second core 102b along which the air cools down, the opening of the housing part 105c and into the air chamber layer 44.

FIG. 21b shows the valve system with heat exchanger 100 in a cooling and air renewal configuration to achieve the cooling and air renewal setting shown in FIG. 18a. The outside flap 104a, the air chamber flap 104c and the inside flap 104c are operated to bring the outside air in fluid communication with the air chamber layer 44 and the interior of the building structure. Hot air may therefore flow from the outside through the opening of the flap housing part 105a, a portion of the first core 102a, the air cavity 114, whereupon the air flow is divided to flow, on the one hand, upwardly into the air chamber layer 44 as described above for the cooling setting and, on the other hand, through the first core 102a, along which the air cools down, the opening of the flap housing part 105b and into the interior 40 of the building structure.

FIG. 21c shows the valve system with heat exchanger 100 in a heating configuration to achieve the heating setting shown in FIG. 18e. The water tank 56 is filled with hot water and is in fluid communication with the water chamber 106 of the valve system 100, via the closed circuit so that the first and second core 102a, 102b are partially soaked with hot water. The inside flap 104b and the air chamber flap 104c are operated to bring the interior 40 of the building structure in fluid communication with the air chamber layer 44 while the outside flap 104a is operated to prevent air from flowing out of the interior 40 of the modular building structure to the outside. The air may therefore flow from the interior 40 through successively the opening of the flap housing part 105b, the first core 102a along which the air heats up, the air cavity 114, the second core 102b along which the air temperature increased further, the opening of the flap housing part 105c and into the air chamber layer 44.

FIG. 21d shows the valve system with heat exchanger 100 in a heating and air renewal configuration to achieve a heating setting which differs slightly from the heating and air renewal setting of the modular building structure shown in FIG. 18b which is equipped with valve systems without heat exchanger. This is because the valve systems with heat exchanger 100 of the modular building structure of the embodiment schematically shown in FIG. 19 improve considerably the change in air temperature allowing the air to be heated without even having to pass through the air chamber layer inside which the air may be heated further by radiation from the sun.

As shown in FIG. 21d, the outside flap 104a, the air chamber flap 104c and the inside flap 104b are operated to bring the outside air in fluid communication with the air chamber layer 44 and the interior 40 of the building structure. Cold air may therefore flow from the outside through the opening of the flap housing part 105a, a portion of the first core 102a, the air cavity 114, whereupon the air flow is divided to flow, on the one hand, upwardly through the second core 102b along which the air heats up, the opening of the housing part 105c and into the air chamber layer 44 and, on the other hand, through the first core 102a, along which the air heats up, the opening of the flap housing part 105b and into the interior 40 of the building structure.

The skilled person would readily adapt the lower valve systems with heat exchanger 100 as shown in FIG. 20 for performing the functions of the upper valve systems with heat exchanger 100 of FIG. 19 to achieve the different settings illustrated in FIGS. 18a to 18f.

REFERENCE LIST

Modular building structure 10
  Framework 12
    Rods 14
    Hub connectors 16
      Rod connecting part 17
      Outer pane connecting part 18a
      Inner pane connecting part 18b
      Intermediate pane connecting part 18c
  Panels 20
    Outer pane 22a
    Inner pane 22b
      Electrical connection module 21
    Intermediate pane 22c
      Protective frame 22d
      Outer pane connector 23a
      Inner pane connector 23b
      Intermediate pane connector 23c
    Connecting interfaces 20a, 20b, 20c
    Frame 24
      Lower side 24a
      Upper side 24b
      Inner side 24c
      Air space 25
      Apertures 26
      Pane connectors 28
        First and second grooves 28a, 28b
      Rod receiving part 30
  Connecting interface 34
  Sealed cavity 35
  Interior 40
  Air chamber layer 44
  Upper valve system 46a
  Lower valve system 46b
  Chimney
  Base 50
    Bars 52
    Connectors 54
    Water tank 56
  Doors 60
  Solar panels 70
  Windmill 80
  Gutter 90
  Ground cooling channel 95
  Valve system with heat exchanger 100
    Housing 101
      First and second body parts 101a, 101b
    First and second cores 102a, 102b
    Outside flap 104a
    Inside flap 104b
    Air chamber flap 104c
    Flap housing part 105a, 105b, 105c
    Water chamber 106
      Inlet 108a
      Outlet 108b
    Water tank 110
    Fan 112
    Air cavity 114

The invention claimed is:

1. A Modular building structure comprising:
a framework comprising a plurality of rods and hub connectors to interconnect the plurality of rods together, the framework comprising empty spaces bordered by corresponding rods of said plurality of rods,
a plurality of panels, wherein one panel is mounted inside each empty space and is connected to said framework in order to create an interior,
an air chamber layer inside which air may circulate, said air chamber layer forming at least a portion of an outer surface of the interior,
at least one upper valve system mounted in an upper portion of the modular building structure, and at least one lower valve system mounted in a lower portion of the modular building structure,
wherein said at least one upper and lower valve systems are selectively actuable to perform each of the following functions a) to f):
a) draw the air outside the modular building structure through the at least one lower valve system into the air chamber layer and to expel the ascending air from the air chamber layer to outside the modular building structure through the at least one upper valve system,
b) draw the air inside the interior through the at least one lower valve system into the air chamber layer and to expel the ascending air from the air chamber layer into the interior through the at least one upper valve system,
c) seal the air chamber layer and the interior from the outside such that the air chamber layer acts as an insulator layer,
d) draw the air inside the interior into the air chamber layer through the at least one lower valve system and to expel the ascending air from the air chamber layer to outside the modular building structure through the at least one upper valve system while the interior is in fluid communication with the air outside the modular building structure through the at least one lower valve system,
e) draw the air outside the modular building structure through the at least one lower valve system into the air chamber layer and to expel the ascending air from the air chamber into the interior through the at least one upper valve system while the interior is in fluid communication with the air outside the modular building structure through the at least one lower valve system, and
f) create a first and a second air communication between the air outside the modular building structure and an upper and a lower part of the interior through respectively the at least one upper valve system and the at least one lower valve system, and
wherein some or all of said panels comprise each an outer pane comprising outer pane connectors and an inner pane comprising inner pane connectors, said outer pane connectors being connected to corresponding outer pane connecting parts of different hub connectors, said inner pane connectors being connected to corresponding inner pane connecting parts of the same of said different hub connectors, and wherein the outer pane and the inner plane of each panel of said some or of all of said panels form therebetween an air space in fluid communication with the air space of adjacent panels to create said air chamber layer.

2. The modular building structure of claim 1, wherein said at least one lower valve system comprises a housing arranged upstream the air chamber layer and extending from outside towards the interior of the building structure, the housing comprising a water chamber and at least one core mounted inside the water chamber, the water chamber comprising an inlet and an outlet in fluid communication with a water tank arranged on a base of the modular building structure to cool down air flowing through said at least one core coming from outside before entering the air chamber layer, or to heat up air flowing through said at least one core coming from outside or from the interior of the building before entering the air chamber layer.

3. The modular building structure of claim 2, wherein the housing comprises first, second and third flap housing parts defining an opening in fluid communication with the at least one core, the at least one lower valve system comprising an outside flap, an inside flap and an air chamber flap pivotably mounted inside respective first, second and third flap housing parts, each flap being arranged to be actuated to be brought from an open configuration to a closed configuration and vice versa to activate the at least one lower valve system according to functions a) to f).

4. The modular building structure of claim 2, wherein said at least one lower valve system includes a heat exchanger and comprises a first and a second longitudinal core mounted inside the water chamber, said first and second longitudinal cores extending perpendicularly from each other.

5. The modular building structure of claim 3, wherein said at least one lower valve system comprises a fan mounted at a distal end of the first and/or of the second longitudinal core.

6. The modular building structure of claim 2, wherein said at least one core is made of ceramic, or any other hydrophilic porous material, comprising a honeycomb structure.

7. The modular building structure of claim 1, wherein the air chamber layer forms substantially an entire wall of the interior.

8. The modular building structure of claim 1, wherein the outer pane and the inner pane of said panels comprise each N rectilinear sides, the outer pane and the inner pane comprising respectively N outer pane connectors and N inner pane connectors mounted on converging portions of two rectilinear sides of said outer pane and said inner pane respectively.

9. The modular building structure of claim 8, wherein N is a number selected between 3 and 8.

10. The modular building structure of claim 1, wherein some or all the panels comprise at least one intermediate pane mounted between the outer and inner panes.

11. The modular building structure of claim 10, wherein said at least one intermediate pane, and/or the outer pane and/or the inner pane is/are selected between a solar cell panel, a photovoltaic/thermal (PVT) panel, a thermal collector panel, a heated glass, a smart glass, an insulating panel and a transparent pane.

12. The modular building structure of claim 11, wherein said smart glass is configured to change from transparent to translucent or opaque and vice versa, said smart glass being electrically connected to a power source and a control unit to control the appearance of said smart glass.

13. A Method for operating the at least one upper and lower valves systems of the modular building structure of claim 1, so as to draw the air inside the interior through said at least lower valve system into the air chamber layer and to expel the ascending air from the air chamber layer through said upper valve system into the interior to increase the temperature inside the interior during a first period of time.

14. The method of claim 13, further comprising the step of operating said at least one upper and lower valve systems, during a second period of time different from said first period of time, so as to draw the air outside the modular building structure through the at least one lower valve system into the air chamber layer and to expel the ascending air from the air chamber layer into the interior through the at least one upper valve system while the interior is in fluid communication with the air outside the modular building structure through at least one lower valve system.

15. The method of claim 13, further comprising the step of operating said at least one upper and lower valve systems, during a second period of time different from said first period of time, so as to seal the air chamber layer and the interior from the outside such that the air chamber layer acts as an insulator layer.

16. The method of claim 13, further comprising the step of operating said at least one upper and lower valve systems, during a second period of time different from said first period of time, so as create a first and a second air communication between the air outside the modular building structure and an upper and a lower part of the interior through respectively the at least one upper valve system and the at least one lower valve system.

17. The method of claim 13, further comprising the step of operating said at least one upper and lower valve systems, during a second period of time different from said first period of time, so as to draw the air outside the modular building structure through the at least one lower valve system into the air chamber layer and to expel the ascending air from the air chamber layer to outside the modular building structure through the at least one upper valve system.

18. The method of claim 13, further comprising the step of operating said at least one upper and lower valve systems, during a second period of time different from said first period of time, so as to draw the air inside the interior into the air chamber layer through the at least one lower valve system and to expel the ascending air from the air chamber layer to outside the modular building structure through the at least one upper valve system while the interior is in fluid communication with the air outside the modular building structure through the at least one lower valve system.

\* \* \* \* \*